United States Patent Office 2,832,017
Patented Apr. 22, 1958

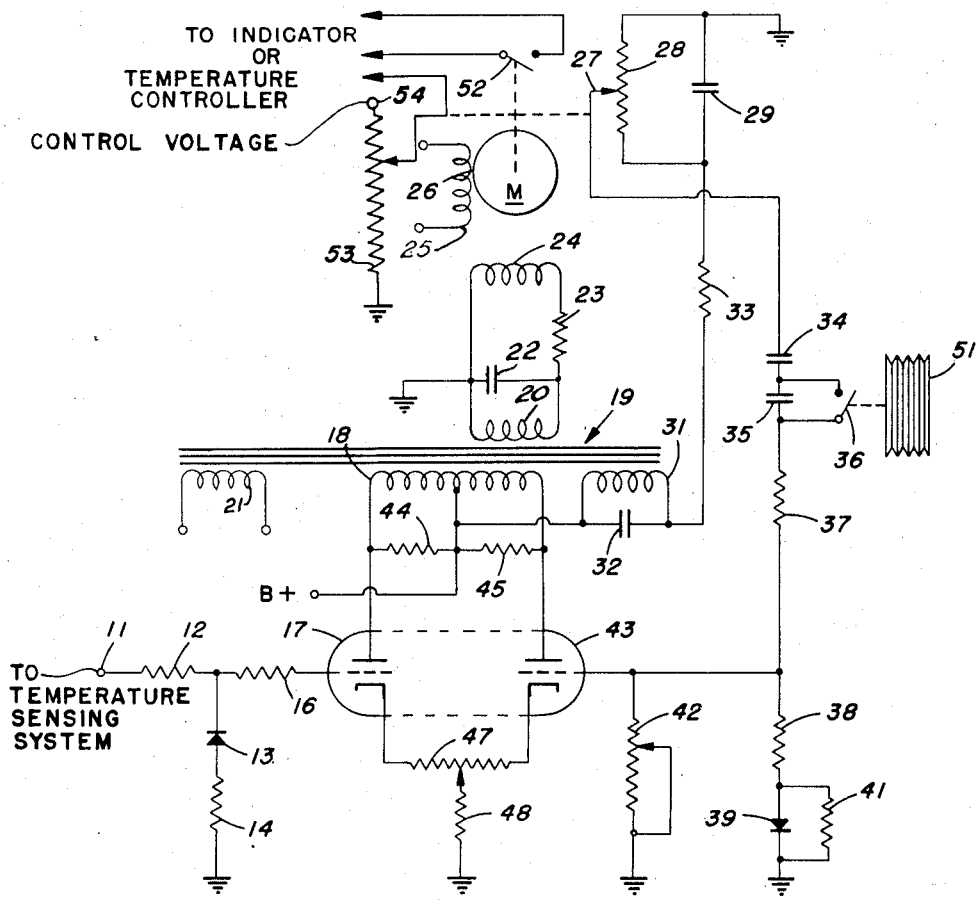

2,832,017

AUTOMATIC TEMPERATURE CONTROL SYSTEM

John L. Evans, Mission, Kans., assignor, by mesne assignments, to the United States of America as represented by the Secretary of the Navy Application June 7, 1956, Serial No. 590,076

13 Claims. (Cl. 318—28)

The present invention relates to an automatic temperature control system and more particularly to an improved trim motor control circuit of an automatic temperature control system for controlling the exhaust gas temperatures of a jet engine.

Automatic temperature control systems are used to control the exhaust nozzle area of jet engines for controlling the exhaust gas temperature. A temperature sensing device is placed in the exhaust gas stream and produces a voltage that is processed by an amplifier system which in turn energizes a trim motor system for changing the exhaust nozzle area whenever the temperature of the exhaust gas stream differs from what is called the temperature set point. This temperature set point is the desired temperature for the exhaust gas stream and is set into the amplifier system that is fed by the temperature sensing device. Conventional trim motor systems have disadvantages in that they produce temperature oscillations and trim motor oscillations that cause a change in the temperature set point. These oscillations are the result of a "hunting" operation by the trim motor circuit. A relatively large temperature difference between the desired exhaust temperature and the actual exhaust temperature causes the trim motor to run in a closing direction at a very rapid rate in the case of an under-temperature error, and the inertia of the trim motor produces an overshoot of the exhaust temperature which in turn causes the trim motor to run in an opening direction at a very rapid rate and this in turn causes the trim motor to run in a closing direction at a very rapid rate, etc. Also, this undesirable "hunting" of the trim motor is partially produced by the delay in the temperature sensing element; for example, on a jam acceleration from idle to military throttle setting a very large error signal is suddenly imposed upon the automatic temperature control system and the trim motor starts closing immediately and continues to close at the same rate until the error signal becomes rather small. It does not stop closing until the error signal from the amplifier system reaches zero. Since the nozzle takes approximately one second or slightly less to close and there is approximately a one second thermocouple delay, it is possible for the trim motor to go completely closed even though the temperature conditions of the exhaust gas stream do not require this. The result is that the exhaust nozzle closes completely and causes the engine exhaust temperature to overshoot considerably. The trim motor then has a very large signal which causes it to open the exhaust area very rapidly and produces a temperature undershoot. Also, any rapid movement of the throttle produces temperature oscillations. Present automatic temperature control systems have rate feedback control units to provide a negative feedback signal to the trim motor and thereby decrease these undesirable oscillations, but unfortunately these prior art rate feedback control systems do not do what is required to prevent temperature and trim motor oscillations.

The present system is an improvement over the prior art rate feedback control circuits and other portions of the automatic temperature control circuit. It substantially eliminates the temperature and trim motor oscillations of the prior art systems and also has the additional advantage of safeguarding against engine overheating. Elements are inserted into the rate feedback control circuit for increasing the amount of negative feedback and thereby appreciably diminishing these oscillations, but with the additional advantageous feature of maintaining an optimum opening to closing speed ratio for the exhaust nozzle. Also, some circuit components are provided for greatly increasing the amount of negative feedback at high altitudes only. This increased amount of feedback can not be tolerated at low altitudes inasmuch as the increased feedback slows down the response of the trim motor to such a degree that the trim motor can not follow the temperature signal from the automatic temperature control system with sufficient speed; however, at high altitudes the decrease in oxygen makes the jet engine operate more sluggishly and the trim motor response must be diminished to compensate for this sluggishness and thus increased feedback is provided. A non-linear limiting circuit is inserted to limit signals from the amplifier system that produces a closing speed of the trim motor; thus, the closing speed signal is limited in amplitude thereby permitting the rate feedback control unit to determine the closing speed of the trim motor, but due to the non-linearity of the limiting circuit, opening speed signals are fed in full strength to provide a very rapid opening speed for the trim motor and thereby avoid overheating of the jet engine. An additional feature is the insertion of an energy damping element in the control winding of the trim motor. Trim motor oscillations and temperature oscillations are caused by oscillations of current in the trim motor control windings and this energy damping element reduces these current oscillations.

Accordingly, an object of the present invention is the provision of an automatic temperature control system for substantially eliminating trim motor and temperature oscillations.

Another object is to provide an automatic temperature control system which produces an optimum ratio of closing to opening speed for the exhaust nozzle of a jet engine.

A further object of the invention is the provision of a system that substantially eliminates trim motor and temperature oscillations in a jet engine at high altitudes.

Still another object of the invention is the provision of an automatic temperature control system that has a safeguard feature against engine overheating.

Other objects and many of the attendant advantages of this invention will be readily appreciated as the same becomes better understood by reference to the following detailed description when considered in connection with the accompanying drawings wherein:

The sole figure shows a circuit diagram of a preferred embodiment of the invention.

Referring now to the drawing (which illustrates a preferred embodiment of the invention), an error signal proportional to engine exhaust temperature is obtained from the amplifier system of the automatic temperature control system (not shown) and is fed to terminal 11 through resistor 12, across limiting diode 13 and voltage biasing resistor 14, and through resistor 16 to the grid of triode 17. The anode of triode 17 is coupled to control winding 18 of a saturable transformer 19 that is also provided with a primary winding 21, a secondary winding 20, and a feedback winding 31. The resulting change in current flow through triode 17 produces a change in flux in the transformer core of transformer 19 and thereby controls the magnitude of the voltage generated in secondary 20 that is fed across capacitor 22 and through resistor 23 to control winding 24 of trim motor 26. Trim motor 26 is provided with the usual reference phase winding 25 that is energized from a source (not shown) with a voltage dephased from the voltage applied to control winding 24. Motion from the shaft of trim motor 26 is coupled by any suitable means to a signal producing device here shown to comprise a potentiometer arm 27 that rides on potentiometer resistance element 28, the latter being shunted by capacitor 29. The sum of the B+ supply voltage and the induced voltage in secondary 31 of transformer 19, which is coupled in parallel with smoothing capacitor 32, is fed through resistor 33 to provide a source of voltage for potentiometer resistor wire 28. Any change of voltage on potentiometer arm 27 is fed through series connected capacitors 34 and 35, when the latter is not shunted by switch 36, and through resistor 37 across a non-linear impedance arrangement comprising resistor 38, diode 39 and resistor 41, across a feedback control unit that controls the magnitude of feedback signal, here shown to be a rheostat 42, to the grid of triode 43. Triode 43, triode 17, and associated circuit elements form a balancing circuit for feeding current to primary winding 18 as a function of the difference in grid voltages applied to triode 17 and triode 43. The plate current of triode 43 flows through winding 18 in flux inducing opposition to the plate current of triode 17. Voltage dividing resistors 44 and 45 are placed in the plate circuits of these two tubes to ensure that the voltage supply to each tube from the B+ source is approximately the same; also, in order to permit adjustment for balance operation, a potentiometer 47 is situated in the cathode circuits. A resistor 48 connects the arm of this potentiometer to ground. The previously mentioned shunting switch 36 is actually an aneroid switch that is operated by bellows 51 to short capacitor 35 at high altitudes, thereby removing this capacitor from the feedback network. Accordingly, the circuit including winding 31, potentiometer 28, and triode 43 operates as a negative feedback circuit to control the operation of the trim motor control circuit and provides a feedback signal proportional to the magnitude of the error signal, the direction of the temperature error, the altitude at which the aircraft is operating, and the rotational rate of the trim motor. Trim motors are conventionally provided with switches similar to switch 52 which close a circuit to a relay, or the like, when the trim motor 26 is in an untrimmed position and thus notify the operator that the trim motor is completely closed. There is further provided a potentiometer 53 having the wiper arm thereof coupled to motor 26 and having one terminal 54 thereof coupled to a suitable voltage source. The wiper arm of potentiometer 53 may be connected to the temperature control system or to an indicator if manual temperature control is desired.

Referring now to the operation of the circuit diagram shown in the sole figure, a thermocouple, or the like (not shown), placed in the path of the exhaust gas stream of a jet engine, produces a voltage which is a function of the temperature of the exhaust gas stream, and this voltage is fed to an amplifier (not shown) of the automatic temperature control system which produces an output voltage of one polarity whenever the exhaust gas stream is above the desired temperature and an output voltage of the opposite polarity when the temperature is lower than the desire temperature. The magnitudes of these output voltages from the amplifier are functions of the magnitudes of the temperature errors. Leads (not shown) conduct these output voltages to terminal 11 of the trim motor control system portion of the automatic control system shown in the figure. Rectifier 13 is poled so that it will conduct when there is a signal from the amplifier system which tends to operate the trim motor 26 in a direction to provide an output signal to the temperature control system to cause the exhaust nozzle to close, and thus rectifier 13 conducts during an under-temperature condition of said exhaust gas. The conduction of diode 13 provides a relatively low resistance current path for the current accompanying the output voltage, and this current produces a voltage drop across resistor 12 which renders less voltage available for the grid of tube 17. Diode 13 does not conduct for signals on terminal 11 which tend to cause trim motor 26 to open the exhaust nozzle, therefore the full magnitudes of the opening signals are applied to the grid of tube 17. Thus it is seen that the combination of the diode 13 and resistors 12 and 14 are a limiting circuit for closing speed signals only. This is a desirable result inasmuch as the rate of operation of trim motor 26 is a function of the voltage applied to the grid of tube 17 as well as the feedback voltage applied to the grid 43. If the closing speed signal were applied at full magnitude, the operation of tube 17 would completely swamp the operation of tube 43, and trim motor 26 would operate quite rapidly and would overclose the exhaust nozzle due to the lag in the operation of the thermocouple and also the inertia of the trim motor system. This overclosing is undesirable from two aspects: it has a tendency to cause trim motor oscillations and the jet engine could be damaged by the increase in heat that accompanies the overclosing. However, an opening signal applied to grid 17 is not diminished in magnitude by the limiting circuit and trim motor 26 opens the exhaust nozzle as rapidly as possible. This is essential inasmuch as an opening signal is a consequence of a gas exhaust temperature condition that is too high and which might be dangerous to the jet engine and hence the need for the cooling off of the engine as rapidly as possible.

The potentiometer comprising arm 27 and resistance wire 28, tube 43 and the circuitry therebetween form a circuit that produces a negative feedback signal which limits the speed of trim motor 26 when the exhaust nozzle is close to the position that gives the desired gas exhaust temperature. Capacitors 34 and 35 and resistors 37, 38, 41, and 42 and the resistance of diode 39 form a rate circuit that conducts the rate of change of voltage on potentiometer arm 27 to the grid of tube 43. At low altitudes where there is a plentiful supply of oxygen, the operation of the jet motor in response to the movement of trim motor 26 of the exhaust nozzle is rapid and thus a low amount of feedback is necessary since the speed of operation of the trim motor 26 decreases with an increase of negative feedback signal. At higher altitudes, the operation of the jet engine is more sluggish and since it is necessary to increase the negative feedback and thereby decrease the oscillations of trim motor 26, aneroid switch 36 is utilized to short capacitor 35 at these higher altitudes thereby increasing the magnitude of the negative feedback signal fed to the grid of tube 43. This shorting eliminates some of the reactance in the feedback loop and thereby increases the amount of feedback signal.

As previously mentioned, it is desirable to have a slow closing speed and a fast opening speed because of the danger of overheat to the engine, and also to have an optimum ratio of closing to opening speed which is approximately one to two. The impedance arrangement of resistor 38, diode 39 and shunting resistor 41 provide these two features. Since a high amount of negative feedback provides slow operation of trim motor 26, a very high impedance resistor 38 and resistor 41 are inserted to ensure that practically all of the negative feedback obtained from potentiometer arm 27 is fed to the grid of triode 43. During an opening of the exhaust nozzle by trim motor 26, it is essential to have a low amount of negative feedback thereby permitting fast operation of trim motor 26 hence diode 39 is placed in this impedance arrangement and poled to substantially short resistor 41 during an opening of the exhaust nozzle. That is, this impedance arrangement places a high resistance in parallel with feedback control rheostat 42 during a closing speed operation and a low resistance path in parallel with rheostat 42 during an opening speed operation. The ratio of these two resistances determine the opening to closing speed ratio, and thus are selected to provide the optimum ratio.

In order to prevent a change in the temperature control setting with increased feedback, it is necessary to stop the trim motor 26 from oscillating. One additional element for accomplishing this is resistor 23 which is placed in series with the trim motor control winding 24 and which substantially damps out the oscillatory currents in this winding.

It is thus seen that an improved trim motor control circuit has been provided in an automatic temperature control system of a jet engine to prevent temperature overshoots and undershoots and also to prevent damage to the engine from overheating. The improved operation of this trim motor control system is based upon the features which include: the limiting of the closing speed signal from the automatic temperature control system without any limiting of the opening speed signal; the placing of an impedance in the rate feedback circuit at low altitudes to decrease the magnitude of feedback signal and the removal of this impedance at high altitudes to increase the amount of negative feedback signal; the inclusion of an impedance arrangement in the rate feedback loop to increase the feedback for closing speeds without affecting the feedback for opening speeds and for establishing an optimum opening to closing speed ratio; and the insertion of damping elements in the trim motor control windings to dampen the oscillatory currents that accompanying temperature overshoots and undershoots and trim motor oscillations.

Obviously many modifications and variations of the present invention are possible in the light of the above teachings. It is therefore to be understood that within the scope of the appended claims the invention may be practiced otherwise than as specifically described.

What is claimed is:

1. In an automatic temperature control system for controlling the exhaust gas temperatures of a jet engine, a trim motor control system comprising: a trim motor having a control winding for producing an output shaft movement in response to the energization of said control winding, a potentiometer circuit having a potentiometer arm that is connected to move with the output shaft movement of said trim motor thereby producing an output voltage on said potentiometer arm that is a function of the output shaft movement of said trim motor, a balancing circuit having a first input terminal and a second input terminal for energizing said control winding of said trim motor in response to the difference in voltages applied to said first input terminal and said second input terminal, a rate circuit having a series reactance element for connecting the rate of change of the voltage on said potentiometer arm to said second input terminal of said balancing circuit, and a feedback control unit connected to said second input terminal of said balancing circuit for controlling the amount of signal fed to said second input terminal by said rate circuit.

2. The trim motor control circuit of claim 1 and a resistor coupled into the control winding of said trim motor for damping current oscillations in said control winding.

3. The trim motor control circuit of claim 1 and an aneroid switch for shunting out a portion of said series reactance of said rate circuit at high altitudes thereby increasing the amount of signal fed by said rate circuit from said potentiometer arm to said second input terminal of said balancing circuit.

4. The trim motor control circuit of claim 1 and a non-linear impedance circuit joined in parallel with said feedback control unit, said non-linear impedance circuit comprising: a first resistor, a second resistor connected in series with said first resistor, and a rectifier connected in parallel with said second resistor and poled to be rendered conductive by signals fed by said rate circuit to said second input terminal of said balancing circuit corresponding to an opening operation of said trim motor.

5. The trim motor control circuit of claim 1 and a limiting circuit for limiting the magnitude of input signals fed to said first input terminal of said balancing circuit for causing a closing operation of said trim motor, said limiting circuit comprising: a resistor connected in series with said first input terminal so that the temperature signals from said automatic temperature control system are fed through said resistor to said first input terminal, and a resistor and a diode joined in series with each other and connected to provide a shunt path for current on said first input terminal, said diode being poled to conduct upon the occurrence of a signal from said automatic temperature control system which causes said trim motor to perform a closing operation.

6. In an automatic temperature control system having a trim motor for controlling the exhaust gas temperature of a jet engine, a control circuit comprising: a balancing circuit having a first input terminal and a second input terminal for energizing the control windings of said trim motor in response to the difference in voltages on said first input terminal and said second input terminal; a signal producing device connected to produce an electrical signal corresponding to the shaft movement of said trim motor; a rate circuit having a series impedance for providing a feedback signal to said second input terminal of said balancing circuit, said feedback signal being a function of the rate of change of the electrical signal from said signal producing device; and a feedback control unit coupled to said second input terminal of said balancing circuit for controlling the magnitude of feedback signal fed to said second input terminal.

7. The trim motor control circuit of claim 6 and a non-linear impedance circuit coupled in parallel with said feedback control unit for providing a relatively high impedance to feedback signals from said rate circuit corresponding to closing speeds of said trim motor and for providing a relatively low impedance for feedback signals from said rate circuit corresponding to opening speeds of said trim motor.

8. The trim motor control circuit of claim 6 and a switch connected to short a portion of said series impedance of said rate circuit at high altitudes only.

9. The trim motor control circuit of claim 6 and a limiting circuit connected to said first input terminal of said balancing circuit for limiting the magnitudes of signals fed to said first input terminal from said automatic temperature control system for producing a closing operation of said trim motor.

10. The trim motor control circuit of claim 6 and an impedance coupled into the control windings of said trim motor for damping current oscillations in said control windings.

11. The trim motor control circuit of claim 10 and a switch connected to short a portion of said series impedance of said rate circuit at high altitudes only.

12. The trim motor control circuit of claim 11 and a non-linear impedance circuit joined in parallel with said feedback control unit for providing a high impedance to feedback signals from said rate circuit corresponding to closing speeds of said trim motor and for providing a relatively low impedance to feedback signals from said rate circuit corresponding to opening speeds of said trim motor.

13. The trim motor control circuit of claim 12 and a limiting circuit connected to said first input terminal of said balancing circuit for limiting the magnitude of signals fed from said automatic temperature control system to said first input terminal of said balancing circuit for producing a closing speed operation of said trim motor.

References Cited in the file of this patent

UNITED STATES PATENTS

| 2,476,849 | Ergen | July 19, 1949 |
| 2,519,057 | Luck | Aug. 5, 1950 |
| 2,544,790 | Hornfeck | Mar. 13, 1951 |
| 2,699,524 | Jackson et al. | Jan. 11, 1955 |